(12) United States Patent
Mizawa et al.

(10) Patent No.: US 8,844,709 B2
(45) Date of Patent: Sep. 30, 2014

(54) CARD-SHAPED MEDIUM PROCESSING DEVICE AND CONTROL METHOD FOR CARD-SHAPED MEDIUM PROCESSING DEVICE

(75) Inventors: Mamoru Mizawa, Nagano (JP); Keiji Hoson, Nagano (JP); Shinya Miyazawa, Nagano (JP)

(73) Assignee: Nidec Sankyo Corporation (JP)

( * ) Notice: Subject to any disclaimer, the term of this patent is extended or adjusted under 35 U.S.C. 154(b) by 344 days.

(21) Appl. No.: 12/978,899

(22) Filed: Dec. 27, 2010

(65) Prior Publication Data

US 2011/0162941 A1 Jul. 7, 2011

(30) Foreign Application Priority Data

Jan. 4, 2010 (JP) ................................ 2010-000044

(51) Int. Cl.
*B65G 43/00* (2006.01)
*B65G 13/02* (2006.01)
*G06K 7/08* (2006.01)
*G06K 13/08* (2006.01)

(52) U.S. Cl.
CPC .............. *G06K 13/085* (2013.01); *G06K 13/08* (2013.01)
USPC ........... 198/575; 198/617; 198/780; 198/784; 235/475; 235/492; 235/380

(58) Field of Classification Search
None
See application file for complete search history.

(56) References Cited

U.S. PATENT DOCUMENTS 6,016,959 A * 1/2000 Kamo et al. .................. 235/449
6,629,643 B1 * 10/2003 Nagata et al. ................. 235/475

FOREIGN PATENT DOCUMENTS

| JP | 2000-36010 A | 2/2000 |
| JP | 2004-13780 A | 1/2004 |
| JP | 2007-102648 A | 4/2007 |
| JP | 2009-31890 A | 2/2009 |

* cited by examiner

*Primary Examiner* — Kavel Singh
(74) *Attorney, Agent, or Firm* — Cantor Colburn LLP

(57) ABSTRACT

A card-shaped medium processing device may include an insertion port to which a card-shaped medium is inserted, a medium feeder capable of abutting with a card-shaped medium inserted from the insertion port to carry the card-shaped medium, and a motor for driving the medium feeder. A taking-in maximum value which is the maximum value of an output of the motor at the time of a taking-in operation of a card-shaped medium inserted from the insertion port is set to be smaller than an ejecting maximum value which is the maximum value of an output of the motor at the time of an ejecting operation of the card-shaped medium toward the insertion port. A control method for a card-shaped medium processing device may include the same relationship, i.e., the taking-in maximum value is set to be smaller than the ejecting maximum value.

20 Claims, 4 Drawing Sheets

CARD-SHAPED MEDIUM PROCESSING DEVICE AND CONTROL METHOD FOR CARD-SHAPED MEDIUM PROCESSING DEVICE

CROSS REFERENCE TO RELATED APPLICATION

The present invention claims priority under 35 U.S.C. §119 to Japanese Application No. 2010-44 filed Jan. 4, 2010, the entire content of which is incorporated herein by reference.

FIELD OF THE INVENTION

At least an embodiment of the present invention may relate to a card-shaped medium processing device for performing a predetermined processing to a card-shaped medium and a control method for the card-shaped medium processing device.

BACKGROUND

A card reader has been conventionally utilized in which a card is taken into an inside of the device to perform a predetermined processing. In this type of card reader, for example, when a deformed card (bent card) or the like is taken into the inside of the device, a problem may occur that a card is jammed in a card feeding passage which is formed in the inside of the device (card jamming). In order to prevent this problem, a card reader has been proposed which is provided with a forcibly ejecting mechanism for forcibly ejecting a card to the outside of the device when a card jamming is occurred (see, for example, Japanese Patent Laid-Open No. 2007-102648). In the card reader described in the Patent Literature, the forcibly ejecting mechanism is structured of a timing belt contacting with a surface of a card and two timing pulleys over which the timing belt is stretched. When a card jamming is occurred, the timing belt is driven to forcibly eject the card.

The card reader described in the above-mentioned Patent Literature is provided with the forcibly ejecting mechanism and thus, even when a card jamming is occurred in the card reader, the card is forcibly ejected surely. However, since the card reader is provided with the forcibly ejecting mechanism, a structure of the device is complicated and, as a result, its cost is increased.

SUMMARY

In view of the problem described above, at least an embodiment of the present invention may advantageously provide a card-shaped medium processing device and a control method for a card-shaped medium processing device in which occurrence of jamming of a card-shaped medium is restrained with a simple structure and, even when jamming of a card-shaped medium occurs, the card-shaped medium is forcibly ejected.

According to at least an embodiment of the present invention, there may be provided a card-shaped medium processing device including an insertion port to which a card-shaped medium is inserted, a medium feeder or medium feeding means which is capable of abutting with a card-shaped medium inserted from the insertion port to carry the card-shaped medium, and a motor for driving the medium feeder or medium feeding means. In the card-shaped medium processing device, a taking-in maximum value which is the maximum value of an output of the motor at the time of a taking-in operation of a card-shaped medium inserted from the insertion port is set to be smaller than an ejecting maximum value which is the maximum value of an output of the motor at the time of an ejecting operation of the card-shaped medium toward the insertion port.

In the card-shaped medium processing device in accordance with an embodiment of the present invention, the maximum value of an output of the motor at the time of a taking-in operation of a card-shaped medium is set to be smaller than the maximum value of an output of the motor at the time of an ejecting operation of the card-shaped medium. Therefore, in the embodiment of the present invention, even when a special mechanism for restraining jamming of a card-shaped medium is not provided in the card-shaped medium processing device, a card-shaped medium which is unable to be ejected by the medium feeder or medium feeding means is restrained from being taken into the inside of the device. In other words, according to the embodiment of the present invention, occurrence of jamming of a card-shaped medium is restrained with a simple structure. As a result, reliability of the card-shaped medium processing device can be enhanced.

Further, in accordance with an embodiment of the present invention, the maximum value of an output of the motor at the time of an ejecting operation of a card-shaped medium is set to be larger than the maximum value of an output of the motor at the time of a taking-in operation of the card-shaped medium. Therefore, even when a mechanism for forcibly ejecting a card-shaped medium which has been jammed in the inside of the device is not provided in the card-shaped medium processing device, the card-shaped medium is capable of being forcibly ejected. For example, even in a case that a card-shaped medium is forcibly pushed by a user into the inside of the card-shaped medium processing device to occur jamming of the card-shaped medium, the card-shaped medium can be forcibly ejected. In other words, according to the embodiment of the present invention, the card-shaped medium is capable of being forcibly ejected with a simple structure. In addition, in accordance with the embodiment of the present invention, a card-shaped medium which is unable to be ejected by the medium feeder or medium feeding means is restrained from being taken into the inside of the device. Therefore, damage of a card-shaped medium, the medium feeder or medium feeding means or the like is restrained.

Further, according to at least another embodiment of the present invention, there may be provided a card-shaped medium processing device in which a card-shaped medium is taken into the inside to perform a predetermined processing, including an insertion port into which the card-shaped medium is inserted, a medium feeder or medium feeding means which is capable of abutting with the card-shaped medium inserted from the insertion port to carry the card-shaped medium, and a motor for driving the medium feeder or medium feeding means. In the card-shaped medium processing device, a taking-in maximum value which is the maximum value of an output of the motor when the card-shaped medium inserted from the insertion port is taken into the inside at least to a position where the user is unable to hold the card-shaped medium is set to be smaller than an ejecting maximum value which is the maximum value of an output of the motor when the card-shaped medium is ejected toward the insertion port at least to a position where the user is capable of holding the card-shaped medium.

In the card-shaped medium processing device in accordance with the embodiment of the present invention, the maximum value of an output of the motor when the card-shaped medium is taken into the inside at least to a position where the user is unable to hold the card-shaped medium is set to be smaller than the maximum value of an output of the motor when the card-shaped medium is ejected at least to a position where the user is capable of holding the card-shaped medium. Therefore, according to the embodiment of the present invention, even when a special mechanism for restraining jamming of a card-shaped medium is not provided in the card-shaped medium processing device, a card-shaped medium which is unable to be ejected to the position where the user is capable of holding card-shaped medium is restrained from being taken into the inside to the position where the user is unable to hold the card-shaped medium. In other words, according to the embodiment of the present invention, occurrence of jamming of a card-shaped medium is restrained with a simple structure and thus, reliability of the card-shaped medium processing device can be enhanced.

Further, in the embodiment of the present invention, the maximum value of an output of the motor when the card-shaped medium is ejected at least to a position where the user is capable of holding the card-shaped medium is set to be larger than the maximum value of an output of the motor when the card-shaped medium is taken into the inside at least to a position where the user is unable to hold the card-shaped medium. Therefore, even when a mechanism for forcibly ejecting a card-shaped medium which has been jammed in the inside of the device is not provided in the card-shaped medium processing device, in a case that jamming of a card-shaped medium has occurred, the card-shaped medium is capable of being forcibly ejected to a position where a user is capable of holding the card-shaped medium. In addition, in the embodiment of the present invention, a card-shaped medium which is unable to be ejected to the position where a user is capable of holding the card-shaped medium is restrained from taking into the inside to the position where the user is unable to hold the card-shaped medium and thus damage of the card-shaped medium, the medium feeder or medium feeding means or the like is restrained.

In accordance with an embodiment of the present invention, the taking-in maximum value is set to a smaller value than the ejecting maximum value so that only a card-shaped medium is taken into the inside that is capable of being ejected when the motor is driven with the ejecting maximum value. In other words, in accordance with an embodiment of the present invention, the taking-in maximum value is set to a value so that the card-shaped medium that is unable to be ejected when the motor is driven at the ejecting maximum value is unable to be taken into the inside. According to this structure, occurrence of jamming of a card-shaped medium can be prevented. In accordance with an embodiment of the present invention, in a case that a rotation detection mechanism is provided for generating a pulse signal in a rectangular wave shape for detecting a rotation number of the motor, when a time interval of edges of the pulse signal becomes a limiting interval or more at the time of a taking-in operation of the card-shaped medium, a driving output for the motor is set to the taking-in maximum value.

In accordance with an embodiment of the present invention, the ejecting maximum value is a rated output of the motor. According to this structure, when a card-shaped medium is to be ejected, the output of the motor can be utilized to the maximum. Therefore, a permitted range for a card-shaped medium which is capable of being ejected from the card-shaped medium processing device can be widened. In other words, while preventing occurrence of jamming of a card-shaped medium, a permitted range for the card-shaped medium capable of being taken into the card-shaped medium processing device can be widened and a permitted range for a card-shaped medium which is processed in the card-shaped medium processing device can be widened. Further, since the output of the motor can be utilized to the maximum when a card-shaped medium is to be ejected, a permitted range for the card-shaped medium which is capable of being forcibly ejected even when jamming of a card-shaped medium occurs can be widened.

In accordance with an embodiment of the present invention, the motor is controlled by voltage control in which an output is controlled by an applied voltage. Further, in this case, it is preferable that a rotation detection mechanism is provided for generating a pulse signal in a rectangular wave shape for detecting a rotation number of the motor, and a voltage applied to the motor is controlled on a basis of a time interval of edges of the pulse signal. According to this structure, the motor can be controlled so that a time interval of edges of the pulse signal is constant. In other words, the motor can be controlled so that a card-shaped medium is carried at a constant speed in the inside of the card-shaped medium processing device. Therefore, magnetic data recorded on a card-shaped medium can be appropriately read and magnetic data can be appropriately written in the card-shaped medium in the inside of the card-shaped medium processing device.

Further, according to at least another embodiment of the present invention, there may be provided a control method for a card-shaped medium processing device having an insertion port into which a card-shaped medium is inserted, a medium feeder or medium feeding means which is capable of abutting with the card-shaped medium inserted from the insertion port to carry the card-shaped medium, and a motor for driving the medium feeder or medium feeding means. The control method includes a medium taking-in step in which the motor is driven for taking the card-shaped medium into an inside with an output of a taking-in maximum value or less, the taking-in maximum value being a maximum value of an output of the motor when the card-shaped medium inserted from the insertion port is taken into the inside, and a medium ejection step in which the motor is driven for ejecting the card-shaped medium with an output of an ejecting maximum value or less, the ejecting maximum value being a maximum value of an output of the motor when the card-shaped medium is ejected toward the insertion port, and the taking-in maximum value is set to be smaller than the ejecting maximum value.

In the control method for a card-shaped medium processing device in accordance with an embodiment of the present invention, the maximum value of the output of the motor when a card-shaped medium is to be taken into the inside in the medium taking-in step is set to be smaller than the maximum value of the output of the motor when the card-shaped medium is to be ejected in the medium ejection step. According to the control method in accordance with the embodiment of the present invention, even when a special mechanism for restraining jamming of a card-shaped medium is not provided in the card-shaped medium processing device, a card-shaped medium which is unable to be ejected by the medium feeder or medium feeding means is restrained from being taken into the inside of the device. In other words, according to the control method in accordance with the embodiment of the present invention, occurrence of jamming of a card-shaped medium is restrained even when the card-shaped medium processing device is provided with a simple structure. As a result, according to the embodiment of the present invention, reliability of the card-shaped medium processing device can be enhanced.

Further, in accordance with the embodiment of the present invention, the maximum value of an output of the motor at the time of an ejecting operation of a card-shaped medium is set to be larger than the maximum value of an output of the motor at the time of a taking-in operation of the card-shaped medium. Therefore, even when a mechanism for forcibly ejecting a card-shaped medium which has been jammed in the inside of the device is not provided in the card-shaped medium processing device, the card-shaped medium is capable of being forcibly ejected when jamming of the card-shaped medium has occurred. In addition, in accordance with the embodiment of the present invention, since a card-shaped medium which is unable to be ejected by the medium feeder or medium feeding means is restrained from being taken into the inside of the device, damage of a card-shaped medium, the medium feeder or medium feeding means or the like is restrained.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings.

Figure 1:
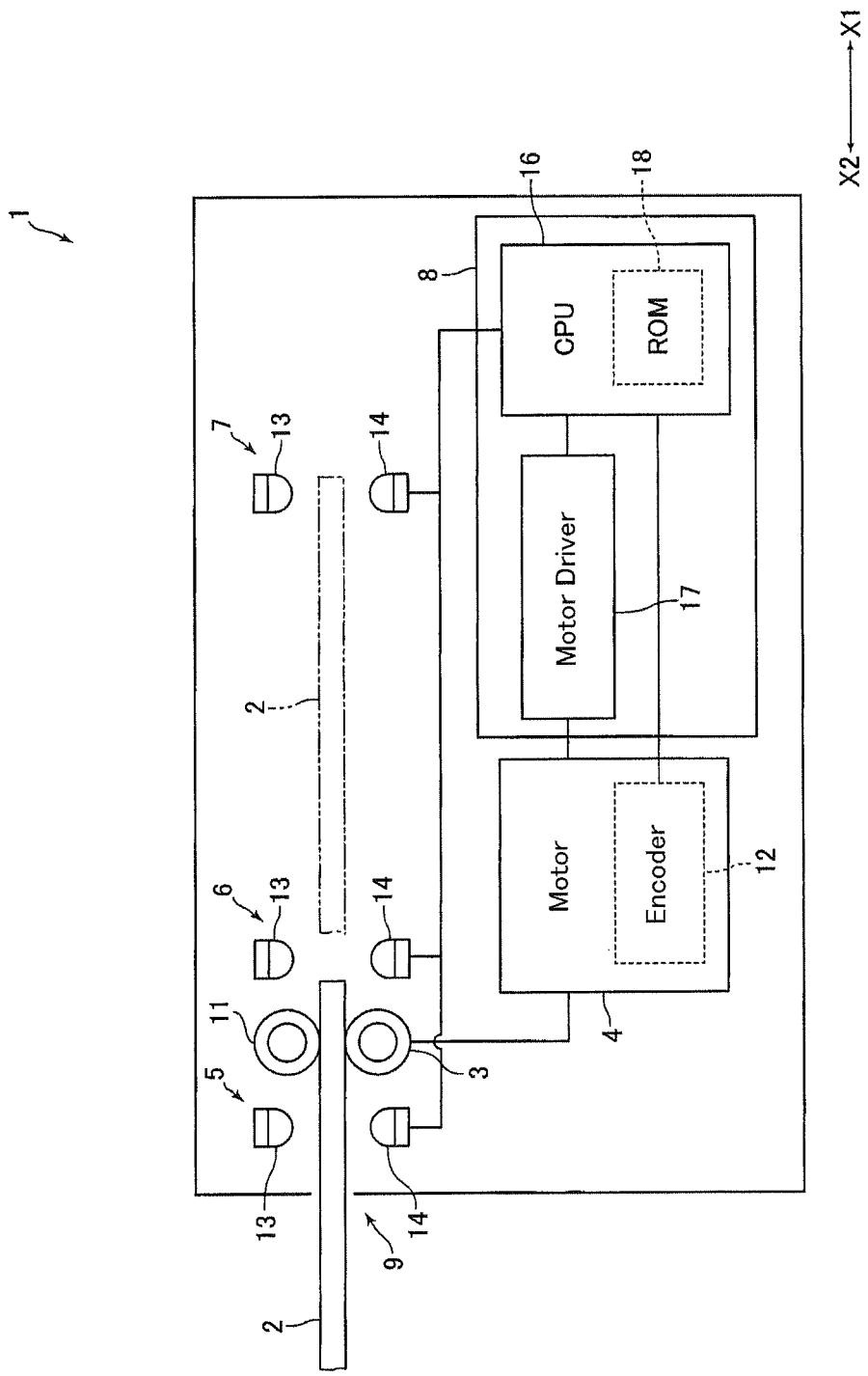
FIG. 1 is an explanatory schematic view showing a schematic structure of a card-shaped medium processing device in accordance with an embodiment of the present invention.
Figure 2:
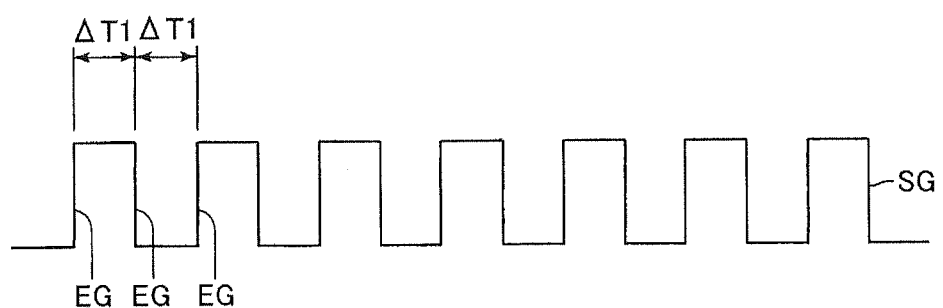
FIG. 2 is a view showing an example of a waveform of a pulse signal which is generated in a CPU shown in FIG. 1.

FIG. 1 is an explanatory schematic view showing a schematic structure of a card-shaped medium processing device 1 in accordance with an embodiment of the present invention. FIG. 2 is a view showing an example of a waveform of a pulse signal SG which is generated in a CPU 16 shown in FIG. 1.

A card-shaped medium processing device 1 in this embodiment is a card reader in which a card 2 as a card-shaped medium is taken into the inside of the device to perform reading of data recorded in or on the card 2 and/or writing data in or on the card 2. Hereinafter, the card-shaped medium processing device 1 in this embodiment is referred to as a "card reader 1". The card reader 1 may be, for example, mounted on a host device and used.

As shown in FIG. 1, the card reader 1 includes carrying rollers 3 as a medium feeder or medium feeding means for carrying a card 2 in the inside of the card reader 1, a motor 4 for driving the carrying rollers 3, a first detection mechanism 5, a second detection mechanism 6 and a third detection mechanism 7 for detecting the card 2 in the inside of the card reader 1, and a control section 8 for controlling the card reader 1. Further, the card reader 1 is provided with a magnetic head (not shown) for reading magnetic data recorded on the card 2. The card reader 1 may be provided with IC contacts for processing a card 2 to which an IC chip is fixed or a communication antenna for processing a card 2 in which a communication antenna is provided.

The card reader 1 is formed with an insertion port 9 into which a card 2 is inserted. Further, the inside of the card reader 1 is formed with a card feeding passage in which the card 2 inserted from the insertion port 9 is carried. In this embodiment, a card 2 is inserted in an "X1" direction shown in FIG. 1 to be taken into the inside and the card 2 is ejected in an "X2" direction. In other words, the "X1" direction is an inserting direction (taking-in direction) of a card 2 and the "X2" direction is an ejecting direction of the card 2. Hereinafter, an end of a card 2 in the "X1" direction is referred to as a "tip end" and an end of a card 2 in the "X2" direction is referred to as a "rear end".

A card 2 is, for example, a rectangular card made of vinyl chloride whose thickness is about 0.7-0.8 mm. The card 2 is formed with a magnetic stripe in which magnetic data are recorded. In other words, the card 2 is a magnetic card. The card 2 may be fixed with an IC chip. Further, the card 2 may be provided with a communication antenna. Further, the card 2 may be a PET (polyethylene terephthalate) card whose thickness is about 0.18-0.36 mm or may be a paper card having a certain thickness.

The carrying rollers 3 are connected with the motor 4 through a power transmission mechanism such as a gear train. Further, a pad roller 11 which is urged toward the carrying roller 3 is disposed so as to face the carrying roller 3. A card 2 is carried under a state that the card 2 is sandwiched between the carrying roller 3 and the pad roller 11. In other words, the carrying roller 3 and the pad roller 11 are abutted with the card 2 which is inserted from the insertion port 9 to carry the card 2. In accordance with an embodiment of the present invention, instead of the pad roller 11, a carrying roller connected with the motor 4 through a power transmission mechanism may be disposed so as to face the carrying roller 3.

The carrying roller 3 and the pad roller 11, which are a first carrying roller and a first pad roller, are disposed on the most insertion port 9 side in the card reader 1. When a tip end side of a card 2 is inserted into the card reader 1 in a state that a user holds a rear end side of the card 2, the tip end side of the card 2 is reached between the carrying roller 3 and the pad roller 11 and then the card 2 is carried by the carrying roller 3 and the pad roller 11 to be taken into the inside of the card reader 1. Further, when the tip end of the card 2 is extracted from the carrying roller 3 and the pad roller 11, which are the first carrying roller and the first pad roller, at the time of ejection of the card 2, the rear end side of the card 2 is protruded to the outside of the insertion port 9 so that the user is capable of holding the rear end side of the card 2. Further, in this embodiment, when the card 2 taken into the card reader 1 is stopped, the rear end side of the card 2 is sandwiched between the carrying roller 3 and the pad roller 11.

The motor 4 is a servomotor. The motor 4 in this embodiment is controlled by voltage control in which its output and rotation number are controlled by an applied voltage. The motor 4 is mounted with an encoder 12 as a rotation detection mechanism for performing servo-control of the motor 4. In other words, the motor 4 is attached with the encoder 12 for detecting a rotation number and a rotating position of the motor 4. The encoder 12 is, for example, structured of a disk-like shaped slit plate which is fixed to a rotation shaft of the motor 4 and an optical type sensor.

The first through the third detection mechanisms 5 through 7 are optical type sensors, each of which is provided with a light emitting element 13 and a light receiving element 14. As shown in FIG. 1, the first detection mechanism 5 is disposed in the vicinity of the insertion port 9, the second detection mechanism 6 is disposed a little on a rear side of the carrying roller 3 in the taking-in direction "X1" of the card 2, and the third detection mechanism 7 is disposed on the innermost end side of the card reader 1 in the taking-in direction "X1" of the card 2.

In this embodiment, when the tip end side of the card 2 is reached between the light emitting element 13 and the light receiving element 14 of the first detection mechanism 5, it is detected that the card 2 is inserted from the insertion port 9. Further, when the tip end side of the card 2 is reached between the light emitting element 13 and the light receiving element 14 of the second detection mechanism 6, it is detected that the card 2 begins to be carried by the carrying roller 3 and the pad roller 11. Further, when the tip end side of the card 2 is reached between the light emitting element 13 and the light receiving element 14 of the third detection mechanism 7, it is detected that the card 2 has been taken into the inside of the card reader 1. On the other hand, in a case that the card 2 is to be ejected from the card reader 1, when the tip end of the card 2 is extracted from a position between the light emitting element 13 and the light receiving element 14 of the second detection mechanism 6, it is detected that the card 2 has been ejected.

The control section 8 is provided with a CPU 16 and a motor driver 17 for controlling the motor 4. Further, the control section 8 is connected with a host control section which is a control section of a host device on which the card reader 1 is mounted. The first through the third detection mechanisms 5 through 7 and the encoder 12 are connected with the CPU 16. Further, an input side of the motor driver 17 is connected with the CPU 16 and an output side of the motor driver 17 is connected with the motor 4. The motor driver 17 applies a voltage to the motor 4 on the basis of an output signal from the CPU 16.

The CPU 16 executes a predetermined arithmetic processing and information processing on the basis of a program recorded in a ROM 18 and controls the motor 4 through the motor driver 17. For example, the CPU 16 controls start and stop of the motor 4 through the motor driver 17 on the basis of output signals from the first through the third detection mechanisms 5 through 7. Further, the CPU 16 generates a pulse signal "SG" in a rectangular wave shape (see FIG. 2) for detecting a rotation number (rotational speed) and a rotating position of the motor 4 on the basis of an output signal from the encoder 12. The disk-like shaped slit plate structuring the encoder 12 is rotated so as to correspond to a carrying speed of a card 2 which is carried by the motor 4 and a pulse signal "SG" corresponding to the carrying speed of the card 2 is generated.

Further, the CPU 16 voltage-controls the motor 4 through the motor driver 17 so that a rotation number of the motor 4 is constant, in other words, a carrying speed of a card 2 is constant. Specifically, the CPU 16 executes a predetermined servo arithmetic operation and calculates an adjusting voltage command value so that a rotation number of the motor 4 is constant and then outputs to the motor driver 17 for performing voltage-control of the motor 4. More specifically, the CPU 16 executes a servo arithmetic operation which uses a time interval "ΔT1" of edges "EG" of a pulse signal "SG" (see FIG. 2), calculates an adjusting voltage command value so that a rotation number of the motor 4 is constant and then, outputs the adjusting voltage command value to the motor driver 17 to perform voltage-control of the motor 4. In other words, in this embodiment, an adjusting voltage "V" applied to the motor 4 is controlled on the basis of the time interval "ΔT1" of the edges "EG" of the pulse signal "SG". Therefore, in a case that a substantially flat card 2 is inserted and carried at a constant speed, the motor 4 rotates at a constant rotation number, and the time interval "ΔT1" of edges "EG" of the pulse signal "SG" is also substantially constant. However, for example, in a case that a card such as a deformed card which is hard to be taken into the inside, the motor 4 rotating the carving roller 3 cannot rotate at a constant speed like a normal operation and thus the time interval "ΔT1" of edges "EG" of the pulse signal "SG" is widened. The servo arithmetic operation in the CPU 16 is, for example, executed according to the following expression wherein an adjusting voltage constant is "S".

$$\text{Adjusting voltage command value} = S \times \Delta T1$$

In this embodiment, at the time of a taking-in operation of a card 2, for example, when a deformed card is inserted and an adjusting voltage "V" applied to the motor 4 on the basis of an adjusting voltage command value which is calculated by the servo arithmetic operation is larger than a limited voltage "Vlim" described below, in other words, when the time interval "ΔT1" of the edges "EG" of the pulse signal "SG" is longer than a predetermined limiting interval, the CPU 16 outputs an adjusting voltage command value by which the adjusting voltage "V" applied to the motor 4 becomes the limited voltage "Vlim" to the motor driver 17 as described below. Further, at the time of ejection of the card 2, when an adjusting voltage "V" applied to the motor 4 on the basis of an adjusting voltage command value which is calculated by the servo arithmetic operation is larger than a maximum voltage "Vmax" described below, the CPU 16 outputs an adjusting voltage command value by which the adjusting voltage "V" applied to the motor 4 becomes the maximum voltage "Vmax" to the motor driver 17 as described below.

In this embodiment, the maximum value at the time of taking-in operation which is the maximum value of an output of the motor 4 (driving force of the motor 4) when a card 2 inserted from the insertion port 9 is taken into the inside of the card reader 1 is set to be smaller than the maximum value at the time of ejecting operation which is the maximum value of an output of the motor 4 when the card 2 is ejected toward the insertion port 9. In other words, the taking-in maximum value at the time of taking-in operation of the output of the motor 4 when a card 2 is taken into the inside is set to a lower value at which a deformed card (bent card) unable to be ejected is not taken into the inside so that a deformed card (bent card) is not taken into the inside even if the card can be taken into the inside but if the card may be unable to be ejected. Therefore, in this embodiment, the maximum voltage applied to the motor 4 is set in a program recorded in the ROM 18 so that the maximum value of the output of the motor 4 when a card 2 is taken into the inside is set to be smaller than the maximum value of the output of the motor 4 when the card 2 is ejected.

Specifically, the ejection maximum voltage applied to the motor 4 when the card 2 is ejected is set so that the ejection maximum value at the time of ejection is the rated output of the motor 4. On the other hand, the taking-in maximum voltage applied to the motor 4 at the time of taking-in operation of a card 2 is set so that the taking-in maximum value at the time of a taking-in operation is capable of taking only the card 2, which can be ejected when the motor 4 is driven at the ejection maximum value, into the card reader 1. In other words, the taking-in maximum voltage applied to the motor 4 at the time of taking-in operation of a card 2 is set so that the maximum value at the time of taking-in operation is unable to take the card 2 in, which is unable to be ejected or guessed to occur card jamming even when the motor 4 is driven at the ejection maximum value. In other words, the taking-in maximum voltage which is applied to the motor 4 at the time of taking-in operation of a card 2 is a limited lower voltage that is limited or restricted with respect to the maximum voltage applied to the motor 4 at the time of ejection of the card 2 and set in a limited small value so that a deformed card which may occur card jamming is not taken into the inside. Therefore, a card 2 which is unable to be ejected by the medium feeder or the medium feeding means is prevented from being taken into the inside of the device. Further, the card 2 taken into the inside is, even when taken into the inside at the taking-in maximum voltage, taken into the inside by means of that the motor 4 is driven at a voltage lower than the ejection maximum voltage which is applied at the time of ejection of the card 2 by the motor 4. Therefore, when the motor 4 is driven at the ejection maximum value, the card 2 having been taken into the inside can be forcibly ejected. For example, the maximum voltage applied to the motor 4 at the time of ejection of a card 2 is set to 5V and the maximum voltage applied to the motor 4 at the time of taking-in operation of a card 2 is set to 3.5V. In other words, although the ejection maximum value is the rated output of the motor 4, the taking-in maximum value is set to a value of 70% of the rated output. Therefore, even in the card 2 having been taken into the inside at the taking-in maximum value, the card 2 is ejected when the card 2 is forcibly ejected at the rated output. In accordance with an embodiment of the present invention, the ejection maximum value is not required to be set to the rated output of the motor 4. Further, the taking-in maximum value may be set in a range of 40%-80% of the ejection maximum value and preferably, in a range of 60%-75% of the ejection maximum value. When the taking-in maximum value is set in the above-mentioned range, a problem does not occur that a card is often unable to be taken into the inside and the card having been taken into the inside can be surely ejected. In the following description, the maximum voltage which is applied to the motor 4 at the time of taking-in operation of a card 2 is referred to as a "limited voltage "Vlim"" and the maximum voltage which is applied to the motor 4 at the time of ejection of a card 2 is referred to as the "maximum voltage "Vmax"".

Figure 3:
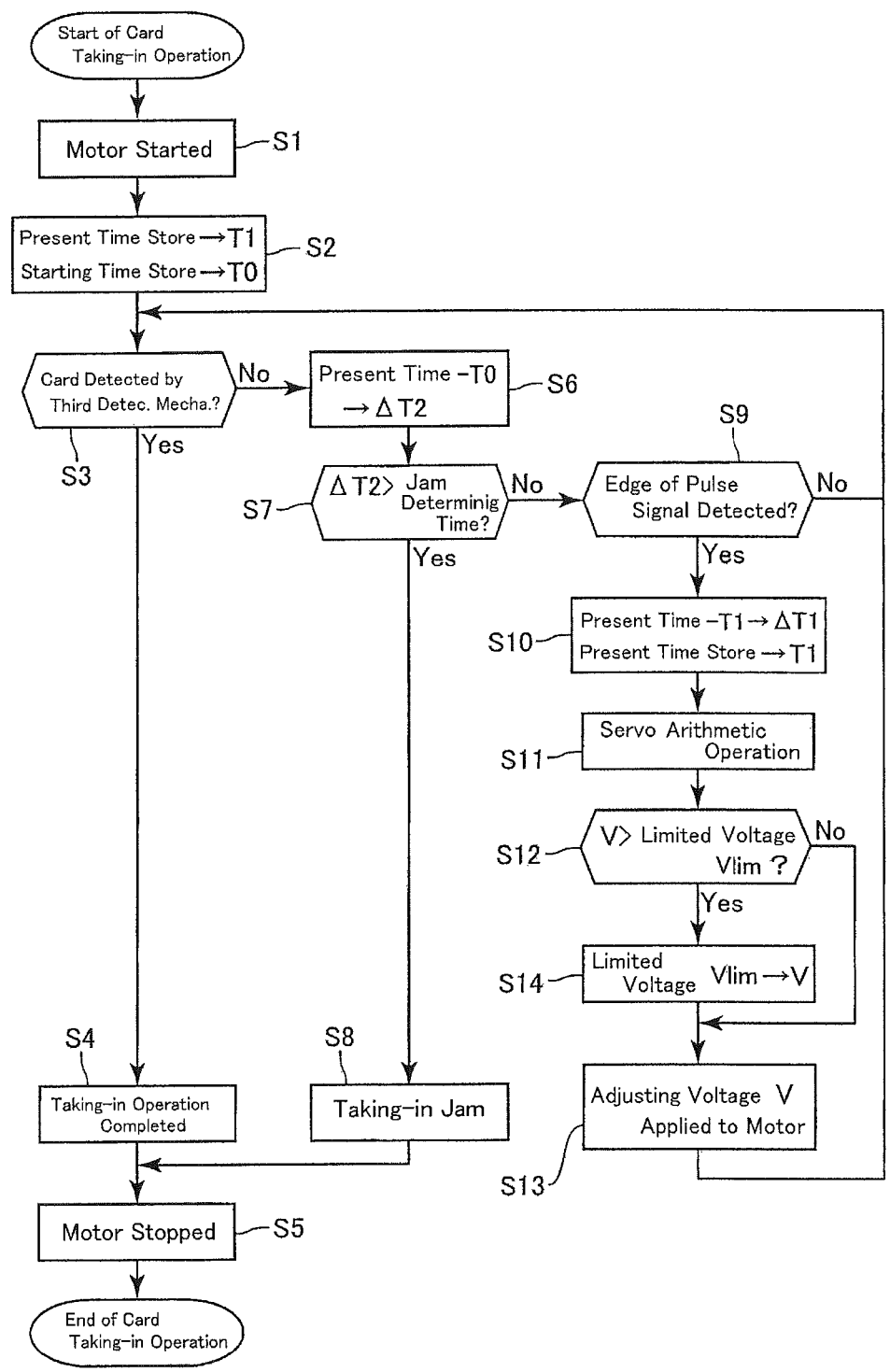
FIG. 3 is a flow chart showing an example of a flow of a taking-in control for a card-shaped medium in the card-shaped medium processing device shown in FIG. 1.
Figure 4:
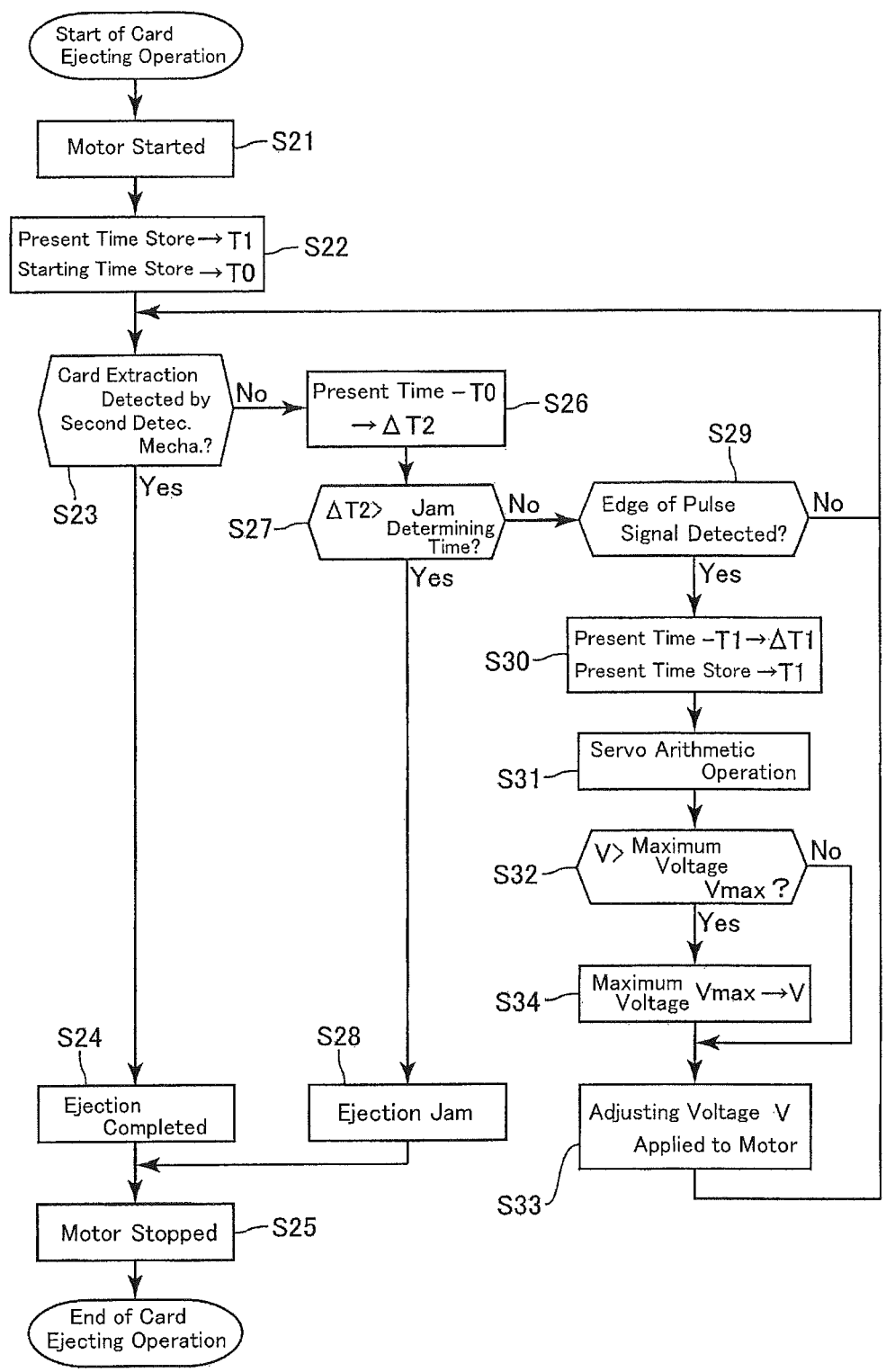
FIG. 4 is a flow chart showing an example of a flow of an ejection control for a card-shaped medium in the card-shaped medium processing device shown in FIG. 1.

FIG. 3 is a flow chart showing an example of a flow of a taking-in control for a card-shaped medium 2 in the card-shaped medium processing device 1 shown in FIG. 1. FIG. 4 is a flow chart showing an example of a flow of an ejection control for a card-shaped medium 2 in the card-shaped medium processing device 1 shown in FIG. 1.

An example of a taking-in control of a card 2 in the card reader 1 structured as described above and an example of an ejection control of a card 2 will be described below.

First, an example of a taking-in control of a card 2 will be described below on the basis of a flow shown in FIG. 3. When a taking-in command for a card 2 is inputted into the control section 8 from the host control section, the control section 8 starts a taking-in control of the card 2. Specifically, first, when a card 2 is detected by the first detection mechanism 5 in the card reader 1 in a waiting state for insertion of a card 2, the motor 4 is started by the CPU 16 through the motor driver 17 (step S1). After that, the CPU 16 stores a starting-time "T0" of the motor 4 and a present time "T1" at this time in a memory means such as a RAM (step S2). The starting-time "T0" and the present time "T1" stored in the step S2 are the same time as each other.

Next, the CPU 16 judges whether a tip end of the card 2 is detected by the third detection mechanism 7 or not (step S3). In the step S3, when the tip end of the card 2 is detected by the third detection mechanism 7, the CPU 16 judges that the taking-in operation of the card 2 has been completed (step S4) to stop the motor 4 (step S5) and the taking-in control of the card 2 is finished.

On the other hand, in the step S3, when the tip end of the card 2 is not detected by the third detection mechanism 7, the CPU 16 calculates a time interval "ΔT2" which is obtained by subtructing the starting-time "T0" from a present time of this time (step S6) and judges whether the time interval "ΔT2" is longer than a preset jam determination time interval or not (step S7). When the time interval "ΔT2" is longer than the jam determination time period in the step S7, the CPU 16 judges that the inserted card 2 is a card 2 such as a deformed card that is not permitted from being taken into the inside or that a taking-in jam of the card 2 is occurred (step S8) and then, in the step S5, the motor 4 is stopped.

Further, in the step S7, when the time interval "ΔT2" is not larger than the jam determination time period (normal state), the CPU 16 judges whether an edge "EG" of a pulse signal "SG" generated on the basis of an output signal from the encoder 12 is detected or not (step S9). When an elapsed time after staring of the motor 4 is short and the edge "EG" is not detected in the step S9, the CPU 16 returns to the step S3.

On the other hand, when an edge "EG" is detected in the step S9, the CPU 16 calculates a time interval "ΔT1" which is obtained by subtructing the present time "T1" having been stored before from a new present time that is the time when the edge "EG" is detected, and the present time "T1" is updated with the new present time when the edge "EG" is detected as a new present time "T1" and then the updated present time "T1" is stored (step S10).

After that, the CPU 16 executes a servo arithmetic operation on the basis of the time interval "ΔT1" of the edges "EG" of the pulse signal "SG" to calculate an adjusting voltage command value (step S11) and, on the basis of the adjusting voltage command value calculated in the step S11, the CPU 16 judges whether a voltage "V" applied to the motor 4 is larger than a limited voltage "Vlim" or not (step S12). In a case that an inserted card 2 is, for example, a deformed card, different from a normal taking-in state, the time interval "ΔT1" of the edges "EG" of the pulse signal "SG" becomes larger. In this embodiment, when the time interval "ΔT1." of the edges "EG" of the pulse signal "SG" is larger than a predetermined limiting interval, the driving output of the motor 4 is set to a limited taking-in maximum value and the voltage "V" applied to the motor 4 in this case is determined as the limited voltage "Vlim". In the normal card carrying state, since the time interval "ΔT1" of the edges "EG" of the pulse signal "SG" is substantially constant and thus the voltage "V" applied to the motor 4 is not required to be larger than the limited voltage "Vlim". Therefore, in a normal state, in the step S12, the voltage "V" is not larger than the limited voltage "Vlim" and thus the CPU 16 outputs the adjusting voltage command value calculated in the step S11 to the motor driver 17, and the motor driver 17 applies the voltage "V" based on the adjusting voltage command value calculated in the step S11 as an adjusting voltage "V" to the motor 4 (step S13) and then, the CPU 16 returns to the step S3.

On the other hand, in a case that the inserted card 2 is, for example, a deformed card, different from a normal taking-in state, the time interval "ΔT1" of the edges "EG" of the pulse signal "SG" becomes larger. Therefore, the voltage "V" applied to the motor 4 on the basis of an adjusting voltage command value calculated in the step S11 becomes also larger. In this case, in the step S12, when the voltage "V" is larger than the limited voltage "Vlim", the CPU 16 sets an adjusting voltage command value whose voltage applied to the motor 4 is the limited voltage "Vlim" (step S14) instead of the adjusting voltage command value calculated in the step S11 and then the step S13 is executed. In this case, in the step S13, the CPU 16 outputs an adjusting voltage command value whose voltage applied to the motor 4 is the limited voltage "Vlim" to the motor driver 17, and the motor driver 17 applies the limited voltage "Vlim" to the motor 4 as an adjusting voltage "V". Therefore, a deformed card which is taken into the inside when the voltage applied to the motor 4 is larger than the limited voltage "Vlim" is prevented from being taken into the inside and thus jamming is prevented from being occurred in the inside of the card reader 1.

In the step S10, after the motor 4 is started, the time interval "ΔT1" which is obtained by subtracting the present time "T1" stored in the step S2 from a new present time when the edge "EG" is firstly detected is not always coincided with the time interval "ΔT1" of the edges "EG". However, when the second and subsequent edges "EG" are detected after the motor 4 is started, in other words, when returned from the step S13 to the step S3, the time interval "ΔT1" which is obtained by subtracting the present time "T1" stored in the last step S10 from a new present time is coincided with the time interval "ΔT1" of the edges "EG".

Next, an example of an ejection control of a card 2 will be described below on the basis of the flow shown in FIG. 4. When an ejection command of a card 2 is inputted into the control section 8 from the host control section, the control section 8 starts an ejection control of a card 2. Specifically, first, the CPU 16 starts the motor 4 through the motor driver 17 (step S21). After that, the CPU 16 stores the starting-time "T0" of the motor 4 and a present time "T1" at this time in a memory means such as a RAM (step S22). Similarly to the case of the taking-in operation of a card 2, the starting-time "T0" and the present time "T1" stored in the step S22 are the same as each other.

Further, the CPU 16 judges whether extraction of a tip end of a card 2 (extraction of tip end) is detected by the second detection mechanism 6 or not (step S23). In the step S23, when extraction of the tip end of the card 2 is detected by the second detection mechanism 6, the CPU 16 judges that ejection of the card 2 has been completed (step S24) and stops the motor 4 (step S25) and the ejection control of the card 2 is finished.

On the other hand, in the step S23, when extraction of the tip end of the card 2 is not detected by the second detection mechanism 6, the CPU 16 calculates a time interval "ΔT2" which is obtained by subtracting the starting-time "T0" from a present time at this time (step S26), and then the CPU 16 judges whether the time interval "ΔT2" is larger than a preset jam determination time (step S27). In this embodiment, no jamming may be basically occurred but, for a rarely case which is not foreseen, the jam determination time is set. In the step S27, when the time interval "ΔT2" is larger than the jam determination time, the CPU 16 judges that an ejection jam of the card 2 has been occurred (step S28) and the motor 4 is stopped in the step S25.

Further, in the step S27, when the time interval "ΔT2" is not longer than the jam determination time, the CPU 16 judges whether an edge "EG" of the pulse signal "SG" is detected or not (step S29). When an elapsed time period after staring of the motor 4 is short and thus an edge "EG" is not detected in the step S29, the CPU 16 returns to the step S23.

On the other hand, when an edge "EG" is detected in the step S29, the CPU 16 calculates a time interval "ΔT1" which is obtained by subtracting the prior present time "T1" having been stored from a present time which is the time when the edge "EG" is detected and the present time "T1" is updated to the present time when the edge "EG" is detected as a new present time "T1" and the updated present time "T1" is stored (step S30).

After that, the CPU 16 executes a servo arithmetic operation on the basis of the time interval "ΔT1" of the edges "EG" of the pulse signal "SG" to calculate an adjusting voltage command value (step S31) and, on the basis of the adjusting voltage command value calculated in the step S31, the CPU 16 judges whether a voltage "V" applied to the motor 4 is larger than the maximum voltage "Vmax" or not (step S32). In the normal card carrying state, the time interval "ΔT1" of the edges "EG" of the pulse signal "SG" is substantially constant and thus the voltage "V" applied to the motor 4 is not increased larger than the maximum voltage "Vmax". Therefore, in the normal state, in the step S32, the voltage "V" is not larger than the maximum voltage "Vmax" and, in this case, the CPU 16 outputs an adjusting voltage command value calculated in the step S31 to the motor driver 17 and the motor driver 17 applies a voltage "V" based on the adjusting voltage command value calculated in the step S31 to the motor 4 as the adjusting voltage "V" (step S33) and then, the CPU 16 returns to the step S23.

On the other hand, in the step S32, when the voltage "V" is larger than the maximum voltage "Vmax", instead of the adjusting voltage command value calculated in the step S31, the CPU 16 sets an adjusting voltage command value whose voltage applied to the motor 4 is the maximum voltage "Vmax" as an adjusting voltage command value (step S34) and then, the step S33 is executed. In this case, in the step S33, the CPU 16 outputs an adjusting voltage command value whose voltage applied to the motor 4 is the maximum voltage "Vmax" to the motor driver 17 and the motor driver 17 applies the maximum voltage "Vmax" to the motor 4 as the adjusting voltage "V".

Similarly to the taking-in control of a card 2, in the step S30, after the motor 4 is stated, the time interval "ΔT1" which is obtained by subtracting the present time "T1" stored in the step S22 from a new present time when the edge "EG" is firstly detected is not always coincided with the time interval "ΔT1" of the edges "EG". However, when the second and subsequent edges "EG" are detected after the motor 4 is started, in other words, when returned to the step S23 from the step S33, the time interval "ΔT1" which is obtained by subtracting the present time "T1" stored in the last step S30 from a new present time is coincided with the time interval "ΔT1" of the edges "EG".

In this embodiment, the steps S1 through S14 are medium taking-in steps where the motor 4 is driven with an output that is not larger than the taking-in maximum value at the time of a taking-in operation of a card 2 that is the maximum value of an output of the motor 4 when the card 2 inserted from the insertion port 9 is taken into the device. Further, the steps S21 through S34 are medium ejection steps where the motor 2 is driven with an output that is not larger than the ejection maximum value at the time of an ejecting operation of the motor 4 when the card 2 is ejected toward the insertion port 9 for ejecting the card 2.

As described above, in this embodiment, the taking-in maximum value of the output of the motor 4 at the time of a taking-in operation of a card 2 is set to be smaller than the ejection maximum value of the output of the motor 4 at the time of an ejecting operation of the card 2. Specifically, the taking-in maximum value of the output of the motor 4 at the time of a taking-in operation of a card 2 is set to be a value capable of taking the card 2, which is capable of being ejected when the motor 4 is driven at the ejection maximum value of the output of the motor 4 at the time of an ejecting operation of a card 2, into the inside of the device. In other words, in this embodiment, the limited voltage "Vlim" which is the taking-in maximum voltage that is applied to the motor 4 at the time of a taking-in operation of a card 2 is set to be a value at which only a card 2, that is capable of being ejected when the ejection maximum voltage "Vmax" that is the maximum voltage applied to the motor 4 at an ejecting operation of a card 2 is applied to the motor 4, is capable of being taken into the inside of the device. Therefore, a deformed card which is taken into the inside when the voltage applied to the motor 4 is larger than the limited voltage "Vlim" is prevented from being taken into the inside and thus jamming is prevented from being occurred in the inside of the card reader 1.

Therefore, in this embodiment, even when a mechanism for restraining jamming of a card 2 is not provided in the card reader 1, a card 2 which is unable to be ejected by the carrying roller 3 and the pad roller 11 is capable of being prevented from taking into the inside of the card reader 1. In other words, in this embodiment, occurrence of jamming of a card 2 can be prevented with a simple structure. As a result, in this embodiment, reliability of the card reader 1 can be enhanced.

Further, in this embodiment, a card 2 which is unable to be ejected by the carrying roller 3 and the pad roller 11 can be prevented from being taken into the inside of the card reader 1 and thus damages of the card 2, the carrying roller 3, the pad roller 11, the magnetic head and the like are restrained.

In this embodiment, the ejection maximum voltage applied to the motor 4 at the time of an ejecting operation of a card 2 is set so that the ejection maximum value of the output of the motor 4 at the time of an ejecting operation of a card 2 is the rated output of the motor 4. Therefore, when a card 2 is ejected, the output of the motor 4 can be utilized to the maximum. Accordingly, a permitted range for a card 2 which is capable of being ejected from the card reader 1 can be widened. In other words, while preventing occurrence of jamming of a card 2, a permitted range for the card 2 capable of being taken into the card reader 1 can be widened. As a result, in this embodiment, a permitted range for a card 2 which is processed in the card reader 1 can be widened.

In this embodiment, the ejection maximum value of the output of the motor 4 at the time of ejection of a card 2 is set to be larger than the taking-in maximum value of the output of the motor 4 at the time of taking-in of the card 2. Therefore, in this embodiment, even when a mechanism by which a card 2 having been jammed in the inside of the card reader 1 is forcibly ejected is not provided in the card reader 1, for example, in a case that a card 2 is forcibly pushed into the inside of the card reader 1 by a user and a jamming of the card 2 is occurred, the card 2 is capable of being forcibly ejected. In other words, in this embodiment, a card 2 can be forcibly ejected with a simple structure.

Especially, in this embodiment, the ejection maximum voltage applied to the motor 4 at the time of ejection of a card 2 is set so that the ejection maximum value of the output of the motor 4 at the time of ejection of the card 2 is the rated output of the motor 4 and thus, a permitted range of a card 2 which is capable of being forcibly ejected even when a jamming of a card 2 is occurred can be widened.

In this embodiment, a voltage applied to the motor 4 is controlled on the basis of the time interval "ΔT1" of the edges "EG" of the pulse signal "SG" so that the rotation number of the motor 4 is constant. In other words, the motor 4 is controlled so that the card 2 is carried at a constant speed in the inside of the card reader 1. Therefore, magnetic data recorded on a card 2 can be appropriately read with a magnetic head not shown and further, magnetic data can be appropriately written on the card 2.

Although the present invention has been shown and described with reference to a specific embodiment, various changes and modifications will be apparent to those skilled in the art from the teachings herein.

In the embodiment described above, the motor 4 is voltage-controlled so that the adjusting voltage "V" applied to the motor 4 on the taking-in operation of the card 2 is not larger than the limited voltage "Vlim". However, the present invention is not limited to this embodiment. For example, the motor 4 may be voltage-controlled so that the adjusting voltage "V" applied to the motor 4 is not larger than the limited voltage "Vlim" in a predetermined period at the time of taking-in operation of a card 2 and, in a period of the other taking-in operation of the card 2, the adjusting voltage "V" applied to the motor 4 is not larger than a second voltage that is larger than the limited voltage "Vlim". Further, in the embodiment described above, the motor 4 is voltage-controlled so that the adjusting voltage "V" applied to the motor 4 at the time of ejection of a card 2 is not larger than the maximum voltage "Vmax". However, the motor 4 may be voltage-controlled so that the adjusting voltage "V" applied to the motor 4 is not larger than the maximum voltage "Vmax" in a predetermined period at the time of ejecting operation of a card 2 and, in a period of the other ejecting operation of the card 2, the adjusting voltage "V" applied to the motor 4 is not larger than a second voltage that is smaller than the maximum voltage "Vmax".

For example, the motor 4 may be voltage-controlled so that the adjusting voltage "V" applied to the motor 4 is set to be not larger than the limited voltage "Vlim" during a period of a taking-in operation of a card 2 that the card 2 is taken into an inner position where a user is unable to hold the card 2 and, in addition, at the time of the taking-in operation of the card 2 after the card 2 has been taken into the position where the user is unable to hold the card 2, the adjusting voltage "V" applied to the motor 4 is set to be not larger than a second voltage (for example, the maximum voltage "Vmax") which is larger than the limited voltage "Vlim". Specifically, when a tip end of a card 2 is sandwiched by the carrying roller 3 and the pad roller 11, which are the first carrying roller and the first pad roller disposed on the most insertion port 9 side in the card reader 1, the card 2 is taken into the inside by the motor 4. However, in this state, when the user keeps holding the rear end side of the card 2, the carrying roller 3, i.e., the motor 4 is unable to rotate and thus the adjusting voltage "V" applied to the motor 4 is increased largely. In a state that the voltage "V" applied to the motor 4 is increased largely as described above, when the holding of the card 2 is released, a card such as a large deformed card may be taken into the inside to cause jamming to occur. However, when the adjusting voltage "V" applied to the motor 4 is set to be not larger than the limited voltage "Vlim" until the card 2 is taken into the position where a user is unable to hold the card 2, occurrence of the problem is prevented. Further, the motor 4 may be voltage-controlled so that the adjusting voltage "V" applied to the motor 4 is set to be not larger than the maximum voltage "Vmax" during a period of an ejecting operation of a card 2 that the card 2 is ejected to a position where a user is capable to hold the card 2 and, in addition, at the time of the ejecting operation of the card 2 after the card 2 has been ejected to the position where the user is capable to hold the card 2, the adjusting voltage "V" applied to the motor 4 is set to be smaller than a second voltage (for example, the limited voltage "Vlim") which is smaller than the maximum voltage "Vmax".

In other words, the maximum value of an output of the motor 4 until the card 2 has been taken into the position where a user cannot hold the card 2 at the time of a taking-in operation of the card may be set smaller than the maximum value of an output of the motor 4 until the card 2 has been ejected to the position where the user can hold the card 2 at the time of ejection of the card 2. Also in this case, even when a special mechanism for restraining jamming of a card 2 is not provided in the card reader 1, a card 2 which is unable to be ejected to the position where a user can hold the card 2 is prevented from being taken into the position where the user cannot hold the card. In other words, even in this case, occurrence of jamming of a card 2 can be prevented with a simple structure.

In the embodiment described above, the maximum voltage applied to the motor 4 at the time of ejection of a card 2 is set so that the maximum value of an output of the motor 4 at the time of ejection of the card 2 is the rated output. However, the present invention is not limited to this embodiment. For example, the maximum voltage applied to the motor 4 at the time of ejection of a card 2 may be set so that the maximum value of an output of the motor 4 at the time of ejection of the card 2 is smaller than the rated output.

In the embodiment described above, the taking-in maximum voltage applied to the motor 4 at the time of a taking-in operation of a card 2 is set so that the taking-in maximum value of an output of the motor 4 at the taking-in operation of a card 2 is a value capable of taking only a card 2, which is capable of ejecting the card 2 when the motor 4 is driven at the ejecting maximum value of an output of the motor 4 at the time of ejection of the card 2, into the inside. However, the present invention is not limited to this embodiment. For example, the taking-in maximum voltage applied to the motor 4 at the time of a taking-in operation of a card 2 may be set so that the taking-in maximum value of an output of the motor 4 at the taking-in operation of a card 2 is a value which is capable of taking only a card 2 into the inside that is capable of being carried at a speed with which magnetic data read with a magnetic head can be appropriately reproduced when the motor 4 is driven with the ejecting maximum value of an output of the motor 4 at the time of ejection of the card 2. In other words, the taking-in maximum voltage applied to the motor 4 at the time of a taking-in operation of a card 2 may be set so that the taking-in maximum value of an output of the motor 4 at the taking-in operation of a card 2 is a value which is unable to take a card 2 into the inside that is unable to be carried at a speed with which magnetic data read with a magnetic head can be appropriately reproduced when the motor 4 is driven with the ejecting maximum value of an output of the motor 4 at the time of ejection of the card 2. Further, the taking-in maximum voltage applied to the motor 4 at the time of a taking-in operation of a card 2 may be set so that the maximum value of an output of the motor 4 at the time of a taking-in operation of a card 2 is another value.

In the embodiment described above, the medium feeder or medium feeding means which is abutted with a card 2 for carrying the card 2 is the carrying roller 3. However, the present invention is not limited to this embodiment. For example, the medium feeder or medium feeding means which is abutted with a card 2 for carrying the card 2 may be structured of a belt which is abutted with a surface of the card 2 and pulleys over which the belt is stretched. Further, the medium feeder or medium feeding means may be structured of a hook-shaped pawl member which is capable of abutting with an end face of a card 2, a belt to which the pawl member is fixed, and pulleys over which the belt is stretched.

In the embodiment described above, the card reader 1 is a device for processing a magnetic card. However, the present invention is not limited to this embodiment. For example, the card-shaped medium processing device to which the structure of the present invention is applied may be a device for processing a contact type IC card or may be a device for processing a non-contact type IC card. Further, the card-shaped medium processing device to which the structure of the present invention is applied may be a printing device for performing printing on a card 2 or an image reading device for reading an image on a surface of a card 2.

In the embodiment described above, the card reader 1 is a card reader in which a card such as a card 2 made of vinyl chloride, a card 2 made of PET or a paper card 2 is used. However, the present invention is not limited to this embodiment. For example, the card-shaped medium processing device to which the structure of the present invention is applied may be a card-shaped medium processing device in which a card-shaped medium such as a passport is used. Further, in the embodiment described above, the motor 4 is voltage-controlled but the motor 4 may be current-controlled.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A card-shaped medium processing device comprising:
   an insertion port to which a card-shaped medium is inserted;
   a medium feeding means which is capable of abutting with a card-shaped medium inserted from the insertion port to carry the card-shaped medium; and
   a motor for driving the medium feeding means;
   wherein a taking-in maximum value which is a maximum value of an output of the motor at a time of a taking-in operation of a card-shaped medium inserted from the insertion port is set to be smaller than an ejecting maximum value which is a maximum value of an output of the motor at a time of an ejecting operation of the card-shaped medium toward the insertion port;
   wherein the output of the motor is a driving force of the motor.

2. The card-shaped medium processing device according to claim 1, wherein the taking-in maximum value is set to a smaller value than the ejecting maximum value so that only the card-shaped medium that is capable of being ejected when the motor is driven at the ejecting maximum value is taken into an inside of the card-shaped medium processing device.

3. The card-shaped medium processing device according to claim 2, further comprising a rotation detection mechanism for generating a pulse signal in a rectangular wave shape for detecting a rotation number of the motor,
   wherein when a time interval of edges of the pulse signal becomes a limiting interval or more at a time of a taking-in operation of the card-shaped medium, a driving output for the motor is set to the taking-in maximum value.

4. The card-shaped medium processing device according to claim 2, wherein the ejecting maximum value is a rated output of the motor.

5. The card-shaped medium processing device according to claim 1, wherein the motor is controlled by voltage control in which an output is controlled by an applied voltage.

6. The card-shaped medium processing device according to claim 5, further comprising a rotation detection mechanism for generating a pulse signal in a rectangular wave shape for detecting a rotation number of the motor,
wherein a voltage applied to the motor is controlled on a basis of a time interval of edges of the pulse signal.

7. A card-shaped medium processing device in which a card-shaped medium is taken into inside and a predetermined processing is performed, comprising:
an insertion port into which the card-shaped medium is inserted;
a medium feeding means which is capable of abutting with the card-shaped medium inserted from the insertion port to carry the card-shaped medium; and
a motor for driving the medium feeding means;
wherein a taking-in maximum value which is a maximum value of an output of the motor when the card-shaped medium inserted from the insertion port is taken at least to a position where a user is unable to hold the card-shaped medium is set to be smaller than an ejecting maximum value which is a maximum value of an output of the motor when the card-shaped medium is ejected toward the insertion port at least to a position where the user is capable of holding the card-shaped medium;
wherein the output of the motor is a driving force of the motor.

8. The card-shaped medium processing device according to claim 7, further comprising a rotation detection mechanism for generating a pulse signal in a rectangular wave shape for detecting a rotation number of the motor,
wherein when a time interval of edges of the pulse signal becomes a limiting interval or more at a time of a taking-in operation of the card-shaped medium, a driving output for the motor is set to the taking-in maximum value.

9. The card-shaped medium processing device according to claim 7, wherein the ejecting maximum value is a rated output of the motor.

10. The card-shaped medium processing device according to claim 7, wherein the motor is controlled by voltage control in which an output is controlled by an applied voltage.

11. The card-shaped medium processing device according to claim 10, further comprising a rotation detection mechanism for generating a pulse signal in a rectangular wave shape for detecting a rotation number of the motor,
wherein a voltage applied to the motor is controlled on a basis of a time interval of edges of the pulse signal.

12. A control method for a card-shaped medium processing device which is provided with an insertion port into which a card-shaped medium is inserted, a medium feeding means which is capable of abutting with the card-shaped medium inserted from the insertion port to carry the card-shaped medium, and a motor for driving the medium feeding means, the control method comprising:
a medium taking-in step in which the motor is driven for taking the card-shaped medium into an inside at an output of a taking-in maximum value or less, the taking-in maximum value being a maximum value of an output of the motor when the card-shaped medium inserted from the insertion port is taken into the inside; and
a medium ejection step in which the motor is driven for ejecting the card-shaped medium at an output of an ejecting maximum value or less, the ejecting maximum value being a maximum value of an output of the motor when the card-shaped medium is ejected toward the insertion port;
wherein the taking-in maximum value is set to be smaller than the ejecting maximum value;
wherein the output of the motor is a driving force of the motor.

13. The control method for a card-shaped medium processing device according to claim 12, further comprising previously providing a rotation detection mechanism for generating a pulse signal in a rectangular wave shape for detecting a rotation number of the motor,
wherein when a time interval of edges of the pulse signal becomes a limiting interval or more at a time of a taking-in operation of the card-shaped medium, a driving output for the motor is set to the taking-in maximum value.

14. The control method for a card-shaped medium processing device according to claim 12, wherein the motor is controlled by voltage control which an output is controlled by an applied voltage.

15. The control method for a card-shaped medium processing device according to claim 14, further comprising previously providing a rotation detection mechanism for generating a pulse signal in a rectangular wave shape for detecting a rotation number of the motor,
wherein a voltage applied to the motor is controlled on a basis of a time interval of edges of the pulse signal.

16. A card-shaped medium processing device for use with a card-shaped medium which is taken into its inside to perform a predetermined processing, the processing device comprising:
an insertion port to which a card-shaped medium is inserted;
a medium feeder which is capable of abutting with a card-shaped medium inserted from the insertion port to carry the card-shaped medium;
a motor for driving the medium feeder;
a control section for controlling the card-shaped medium processing device; and
a rotation detection mechanism for generating a pulse signal in a rectangular wave shape for detecting a rotation number of the motor;
wherein the control section includes a CPU and a motor driver for driving the motor;
wherein the motor is controlled through voltage control where an output is controlled by an applied voltage, and a voltage applied to the motor is controlled on a basis of a time interval of edges of the pulse signal;
wherein a taking-in maximum value which is a maximum value of an output of the motor at a time of a taking-in operation of the card-shaped medium inserted from the insertion port is set to be smaller than an ejecting maximum value which is a maximum value of an output of the motor at a time of an ejecting operation of the card-shaped medium toward the insertion port so that the card-shaped medium which is unable to be ejected by the medium feeder is prevented from being taken in; and
wherein in a case that a voltage applied to the motor when an output of the motor becomes the taking-in maximum value is set to be a limited voltage, at a time of a taking-in operation of the card-shaped medium, when the CPU detects edges of the pulse signal, the CPU calculates an adjusting voltage command value so that a rotation number of the motor is constant on a basis of a time interval of the edges of the pulse signal and, in a case that a voltage based on the adjusting voltage command value having been calculated is not larger than the limited voltage, the adjusting voltage command value having been calculated is outputted to the motor driver as a voltage command value and, in a case that the voltage based on the adjusting voltage command value having been calculated is larger than the limited voltage, a voltage command value whose voltage applied to the motor is the limited voltage is outputted to the motor driver, and the motor driver applies a voltage based on the voltage command value inputted from the CPU to the motor.

17. A card-shaped medium processing device for use with a card-shaped medium which is taken into its inside to perform a predetermined processing, the processing device comprising:
an insertion port to which a card-shaped medium is inserted;
a medium feeder which is capable of abutting with a card-shaped medium inserted from the insertion port to carry the card-shaped medium;
a motor for driving the medium feeder;
a control section for controlling the card-shaped medium processing device; and
a rotation detection mechanism for generating a pulse signal in a rectangular wave shape for detecting a rotation number of the motor;
wherein the control section includes a CPU and a motor driver for driving the motor;
wherein the motor is controlled through voltage control where an output is controlled by an applied voltage, and a voltage applied to the motor is controlled on a basis of a time interval of edges of the pulse signal;
wherein a taking-in maximum value which is a maximum value of an output of the motor when the card-shaped medium inserted from the insertion port is taken at least to a position where a user is unable to hold the card-shaped medium is set to be smaller than an ejecting maximum value which is a maximum value of an output of the motor when the card-shaped medium is ejected toward the insertion port at least to a position where the user is capable of holding the card-shaped medium so that the card-shaped medium which is unable to be ejected by the medium feeder is prevented from being taken in; and
wherein in a case that a voltage applied to the motor when an output of the motor becomes the taking-in maximum value is set to be a limited voltage, at a time of a taking-in operation of the card-shaped medium, when the CPU detects edges of the pulse signal, the CPU calculates an adjusting voltage command value so that a rotation number of the motor is constant on a basis of a time interval of the edges of the pulse signal and, in a case that a voltage based on the adjusting voltage command value having been calculated is not larger than the limited voltage, the adjusting voltage command value having been calculated is outputted to the motor driver as a voltage command value and, in a case that the voltage based on the adjusting voltage command value having been calculated is larger than the limited voltage, a voltage command value whose voltage applied to the motor is the limited voltage is outputted to the motor driver, and the motor driver applies a voltage based on the voltage command value inputted from the CPU to the motor.

18. The card-shaped medium processing device according to claim 16 wherein the ejecting maximum value is a rated output of the motor.

19. The card-shaped medium processing device according to claim 17 wherein the ejecting maximum value is a rated output of the motor.

20. A control method for a card-shaped medium processing device which is provided with an insertion port into which a card-shaped medium is inserted, a medium feeder which is capable of abutting with the card-shaped medium inserted from the insertion port to carry the card-shaped medium, a motor for driving the medium feeder, a rotation detection mechanism for generating a pulse signal in a rectangular wave shape for detecting a rotation number of the motor, and a motor driver for driving the motor, the control method comprising:
driving the motor at an output of a taking-in maximum value or less to take the card- shaped medium into an inside, the taking-in maximum value being a maximum value of an output of the motor when the card-shaped medium inserted from the insertion port is taken into the inside; and
driving the motor at an output of an ejecting maximum value or less to eject the card- shaped medium, the ejecting maximum value being a maximum value of an output of the motor when the card-shaped medium is ejected toward the insertion port;
wherein the motor is controlled through voltage control where an output is controlled by an applied voltage, and a voltage applied to the motor is controlled on a basis of a time interval of edges of the pulse signal;
wherein the taking-in maximum value is set to be smaller than the ejecting maximum value so that the card-shaped medium which is unable to be ejected by the medium feeder is prevented from being taken in; and
wherein in a case that a voltage applied to the motor when an output of the motor becomes the taking-in maximum value is set to be a limited voltage, at a time of a taking-in operation of the card-shaped medium, when edges of the pulse signal are detected, an adjusting voltage command value is calculated so that a rotation number of the motor is constant on a basis of a time interval of the edges of the pulse signal and, in a case that a voltage based on the adjusting voltage command value having been calculated is not larger than the limited voltage, the adjusting voltage command value having been calculated is inputted to the motor driver as a voltage command value and, in a case that the voltage based on the adjusting voltage command value having been calculated is larger than the limited voltage, a voltage command value whose voltage applied to the motor is the limited voltage is inputted to the motor driver, and the motor driver applies a voltage based on the voltage command value having been inputted to the motor.

* * * * *